United States Patent [19]

Rusu

[11] Patent Number: 5,109,168
[45] Date of Patent: Apr. 28, 1992

[54] METHOD AND APPARATUS FOR THE DESIGN AND OPTIMIZATION OF A BALANCED TREE FOR CLOCK DISTRIBUTION IN COMPUTER INTEGRATED CIRCUITS

[75] Inventor: Stefan Rusu, Sunnyvale, Calif.

[73] Assignee: Sun Microsystems, Inc., Mountain View, Calif.

[21] Appl. No.: 661,896

[22] Filed: Feb. 27, 1991

[51] Int. Cl.$^5$ ............ H03K 19/00; H01L 25/00
[52] U.S. Cl. ................. 307/480; 307/269; 307/465.1; 364/490
[58] Field of Search ............ 307/480, 443, 482.1, 307/303, 303.1, 303.2, 465, 465.1; 364/490, 491

[56] References Cited

U.S. PATENT DOCUMENTS 4,639,615  1/1987  Lee et al. ........................ 307/480
4,755,704  7/1988  Flora et al. ...................... 307/269
4,812,684  3/1989  Yamagiwa et al. ............. 307/465.1
4,851,717  7/1989  Yabe ................................ 307/480
5,012,427  9/1991  Kuribayashi .................... 307/480

Primary Examiner—Edward P. Westin
Assistant Examiner—Andrew Sanders
Attorney, Agent, or Firm—Blakely Sokoloff Taylor & Zafman

[57] ABSTRACT

A balanced tree clock distribution network for an integrated circuit including a branching clock line of layered metal in which each branch of the clock line has equal resistance, apparatus for shielding the clock line on both sides in the same layer of material of the integrated circuit, and apparatus for providing jumpers for crossing the clock line at right angles in a different layer of material of the integrated circuit which jumpers apppear at the same preselected distances along each branch of the clock line.

13 Claims, 3 Drawing Sheets

METHOD AND APPARATUS FOR THE DESIGN AND OPTIMIZATION OF A BALANCED TREE FOR CLOCK DISTRIBUTION IN COMPUTER INTEGRATED CIRCUITS

BACKGROUND OF THE INVENTION

1. Field of the Invention

This invention relates to integrated circuits used in computers and, more particularly, to methods for accomplishing the design and optimization of a balanced tree for clock distribution with minimal skew.

2. History of the Prior Art

Most integrated circuits utilized in computers employ a periodic signal referred to as a clock signal to control the timing and throughput of the entire system. This clock signal must reach different functional sub-blocks such as latches and registers which are physically distributed over the area of the integrated circuit. If two such sub-blocks which are controlled by the same clock are at different distances from the clock driver, they will receive the clock signal at different times. This arrival time differential is called clock skew. One major source of clock skew is the delay due to the resistance and the capacitance of the metal lines used to distribute the clock signal to all of the sub-blocks of the integrated circuit. This skew can be minimized by distributing the clock signal such that the metal interconnection lines that carry this signal to all of the sub-blocks are of equal length. The network produced by this technique is referred to as an "H-clock tree" or a "balanced clock tree."

Even if all of the metal lines that carry the clock signal to the various sub-blocks of the integrated circuit have the same lengths there can be a skew between clock signals arriving at different sub-blocks. As was mentioned before, the skew is caused by the RC delay of the metal lines. Even though these lines have the same lengths and widths and thus have the same resistance, this does not necessarily mean that they will have the same capacitance because capacitance depends on the environment in which each of the individual lines runs. Many other metal lines run on the top, bottom, and sides of the clock lines in a custom integrated circuit. These other metal lines have different capacitive effects on the metal clock lines to the sub-blocks causing the RC delay for the different clock lines to be different. To compensate for these differences, it has been the practice for designers to compute the total capacitance of each branch of the clock line and then to adjust the capacitance of each branch manually by adding capacitance to lower valued branches to bring each to a common capacitance value. This process is iterative, very time consuming, and error prone; consequently, the process is very expensive.

SUMMARY OF THE INVENTION

It is, therefore, an object of the present invention to provide a method for designing a balanced tree for clock signal distribution in computer integrated circuits in which all of the branches of the clock line are of the same length and have the same capacitance and the same resistance It is another more specific object of the present invention to provide a balanced tree clock line that has a minimal overall RC delay.

These and other objects of the present invention are realized in a balanced tree clock distribution network for an integrated circuit comprising a branching clock line of layered metal in which each branch of the clock line has equal resistance, means for shielding the clock line on both sides in the same layer of material of the integrated circuit as the clock line, and means for providing jumpers for conductors crossing the clock line at right angles in a different layer of material of the integrated circuit which jumpers appear at the same preselected distances along each branch of the clock line.

These and other objects and features of the invention will be better understood by reference to the detailed description which follows taken together with the drawings in which like elements are referred to by like designations throughout the several views.

DETAILED DESCRIPTION OF THE INVENTION

Figure 1:
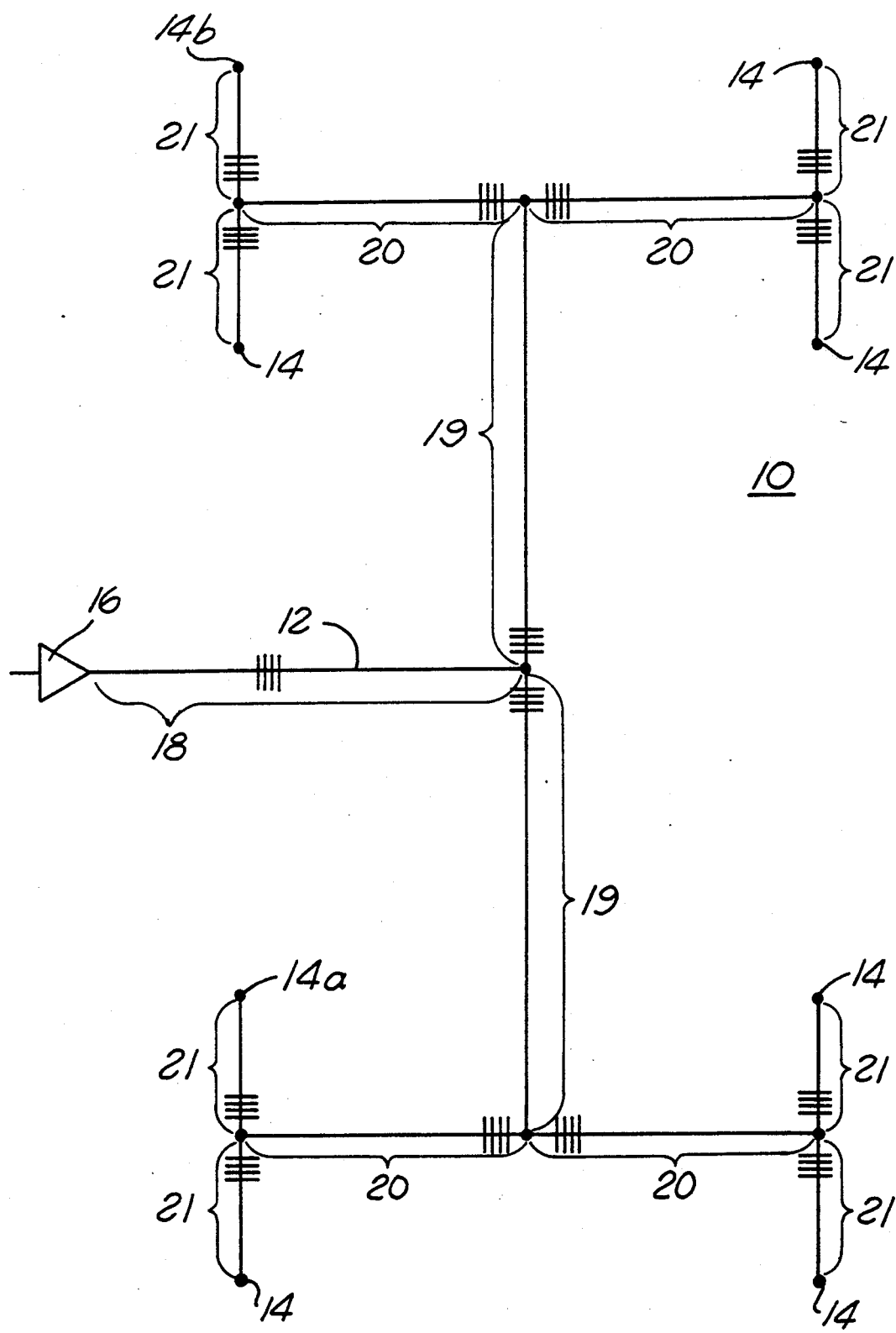
FIG. 1 is a layout of abbreviated wiring diagram for transferring clock signals on an integrated circuit chip.

FIG. 1 illustrates the layout of an abbreviated wiring diagram of a clock distribution network typically employed for transferring clock signals on an integrated circuit chip used in a computer or other digital system. In FIG. 1, an integrated circuit 10 is illustrated on which a metal path 12 has been deposited. The metal path 12 typically resides in only one of a number of layers of metal conductors deposited on the integrated circuit 10. Each metal layer is typically separated from each adjacent layer by an insulating layer known to those skilled in the art. The metal path 12 is used for conducting clock signals to a plurality of different sub-blocks of circuit elements. Although the individual sub-blocks of circuit elements are not shown, the connection to each sub-block of elements is made at one of a number of points 14.

The pattern described by the metal path 12 is termed a balanced tree. This designation refers to the fact that the individual distances traversed by each branch of the tree are all the same when measured from a driver circuit 16 which supplies the clock signals to each point 14 at which a connection to the Sub-block of circuit elements on the chip 10 is made. As may be seen, each such path includes a first path portion 18 from driver 16, a second path portion 19 from the end of the portion 18, a third path portion 20 from the end of a path portion 19, and a fourth path portion 21 from the end of a path portion 20 to the connection point 14.

It is most desirable that the time required for a clock signal to traverse each of the paths be the same and that the time be as short as possible. If the time required for a clock signal to traverse any of the paths is longer than for any other equivalent path, then all the circuit elements of the sub-blocks must wait for the slowest element to operate. This difference in clock time in individual branches of the metal clock path is called clock skew. Clock skew is entirely dead time and limits the speed at which the chip can operate. Consequently, it can be said that the fastest operation of the circuitry requires that the time for the clock signals to traverse the paths be equal and as short as possible.

The time required for a clock signal to traverse each of the branches of the metal clock path from the driver 16 to a connection 14 depends upon the RC delay of the branch circuit between the two points. Since each path from the driver 16 to a connection 14 is equal in length, if each path portion 19 is of equal thickness and width, if each path portion 20 is of equal thickness and width, and if each path portion 21 is of equal thickness and width, then the resistance of each path from the driver 16 to a conection 14 will be equal, presuming all equivalent path portions are manufactured of material having the same resistivity. This equalization of resistances is the primary reason for the existence of the balanced tree arrangement.

Since all of the resistances are the same, variations in capaitance will control the time for a clock signal to traverse any path. Unfortunately, a balanced tree arrangement will not have equal capacitances in each branch path from a driver 16 to a connection 14. This is the case because the capacitance of each branch of the metal path depends on the conductors and other metallic elements which surround each such path. Since circuit layouts of other conductors are almost never symmetrical with respect to the clock lines and in many cases can never be symmetrical, the capacitance affecting each branch path tends to vary from those affecting other branch paths. This variation introduces clock skew and slows the operation of the circuit.

In order to reduce clock skew, it has been the practice of designers to lay out the circuit patterns, test the delay through each path, and add capacitance to the various paths until the delays are balanced as well as possible for the circuitry. The effect of this operation is to slow the clock signal through all of the paths to the transfer speed of the slowest path. Moreover, since all of the individual paths must be varied by time consuming manipulations carried out by hand, the process is very expensive.

The present invention offers a solution to the problem of clock skew which may be easily automated to produce balanced clock lines having both equal resistance and equal capacitance in all branches so that clock skew is essentially eliminated. Moreover, the invention is easily automated so that the hand work formally required to equalize the capacitance in the path is eliminated and the cost of design is significantly reduced. Not only does the invention lend itself to easy automation, it also affords an easy way in which to optimize the RC characteristics so that the time for the clock signals to traverse the clock path branches is minimized.

Figure 2A:
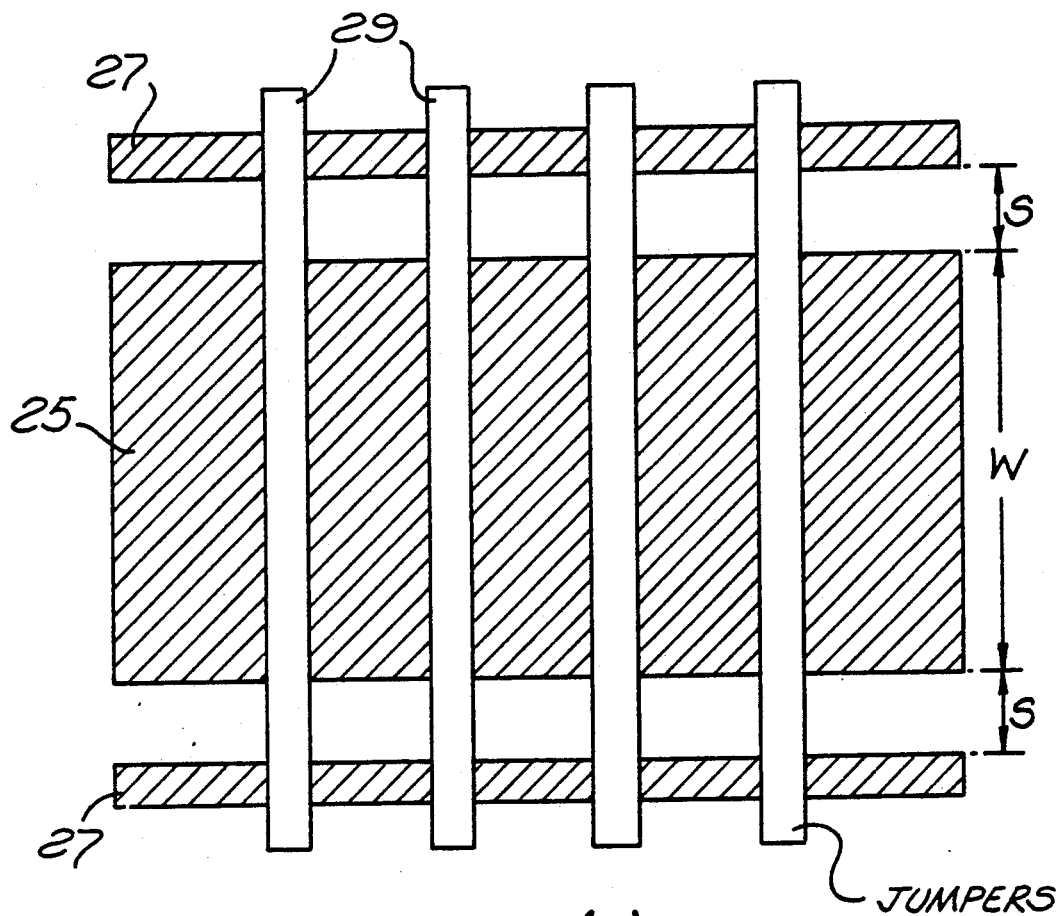
FIG. 2 (a) and (b) are top and side views of a first variation of the invention.

FIG. 2(a) and (b) are top and side views of a short length of the metal path 25 of the integrated circuit 10 used for transferring the clock signals and those metallic conductors in the immediate vicinity of the clock path 25. As may be seen in the FIGS. 2(a) and (b), the metallic path 25 has a selected width W and thickness T. In general, the width W is determined by the amount of current which must be carried to the total of the various circuit elements in the branches using a clock line having a thickness T which is a relatively standard value. On each side of the metal path 25 in the same metallic layer are placed conductors 27. The conductors 27 are of minimal width for the particular integrated circuit and each is grounded. Each of the conductors 27 is positioned a distance S from the edge of the path 25 to provide a minimum capacitive effect. The distance S will vary depending on the paticular integrated circuit chip 10 and the particular wiring dimensions but can be determined by acertaining a distance at which the decrease of capacitance with an increase in distance from the path 25 ceases to be significant. In a preferred embodiment of the invention in which a path 25 has a width W of from 5 to 40 microns and in which a minimum conductor separation of 1.2 microns is maintained, a distance S of 4 microns is used.

The conductors 27 are grounded and act as shields for the path 25 with respect to conductors which might run close to the sides of the path 25 in the same metal layer of the integrated circuit 10.

In order to reduce the capacitive effect of conductors in other metal layers of the integrated circuit 10, metallic jumpers 29 are provided which cross above and below the path 25 isolated therefrom by the oxide or other insulation separating the metal layers. The jumpers 29 typically cross at right angles to the path 25 and are positioned equal distances from one another. By crossing the path 25 at right angles the minimum surface is provided for each conductor 29 facing the path 25 and, consequently, the minimum capacitance for that conductor 29. Of course, it would be possible for the jumpers to cross the path 25 at an angle were this desired for paticular circuitry.

Not all jumpers 29 need to be used in any integrated circuit employing the invention, but any conductor which would otherwise cross the path 25 does so by connection through a jumper 29. Unused jumpers 29 are connected to the conductors 27 by short metallic connections (vias) so that none of the jumpers is floating with respect to ground. If all conductors which cross the paths are restricted to the jumpers 29 in a balanced tree arrangement such as that shown in FIG. 1 and if the placement of the jumpers 29 is the same in each path from the driver 16 to each of the connections 14, then the capacitances of the branches of the clock paths will be essentially equal. With equal capacitances and equal resistances, the RC delay of each path will be equal and clock skew will be reduced to insignificance.

FIG. 1 also illustrates the placement of a number of sets of jumpers 29 such as those illustrated in FIGS. 2(a) and (b) which cross the metal path of the clock signals in the various branches. As may be seen, the sets of jumpers 29 are so positioned in each individual path from the driver 16 to a connection 14 that the same number of jumpers 29 appear in each path and the groups of jumpers appear at the same places in each path. Thus, in traversing from the driver 16 to connections 14a and 14b, each branch of the metal path 25 is crossed by a first set of jumpers 29 in the portion 18, by a sencond set of jumpers 29 in the portions 19 each equidistant from the connection to the portion 18, by a third set of jumpers 29 in the portions 20 each equidistant from the connection to the portion 19, and by a fourth set of jumpers 29 in the portions 21 each equidistant from the connection to the portion 20.

As is discussed above, the process of arriving at such an arrangement may be easily automated by providing a standard cell in the design software which includes the set of jumpers. Such a cell may be copied by the software used in designing the layout of the circuit arrangement so that each set of jumpers is identical to each other set. Of course, this idea may be extended to a plurality of different cells each of a standard length and each having jumpers in slightly different arrangements. Such a variety of cells may be used with other cells of standard lengths representing path isolating conductors 27 along their edges (but without jumpers 29) in designing a clock circuit arrangement for a large integrated circuit having equal capacitances in all branches of the path. In a preferred embodiment of the invention, individual cells have a length of 100 microns where the various branches such as portion 19 in FIG. 1 may have lengths of 1000 microns. The important thing in such a design is that the same jumper cell be placed in the same position in each branch path from the driver 16 to a connection 14 so that the RC delays of each path are equal.

Figure 2B:
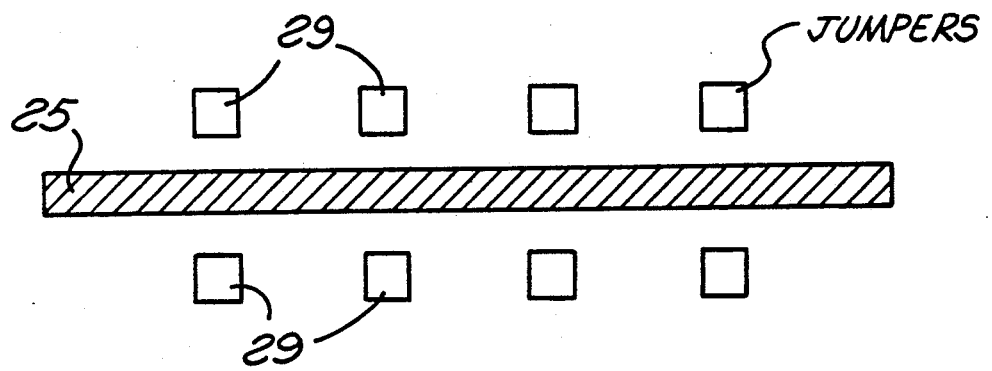
Figure 3:
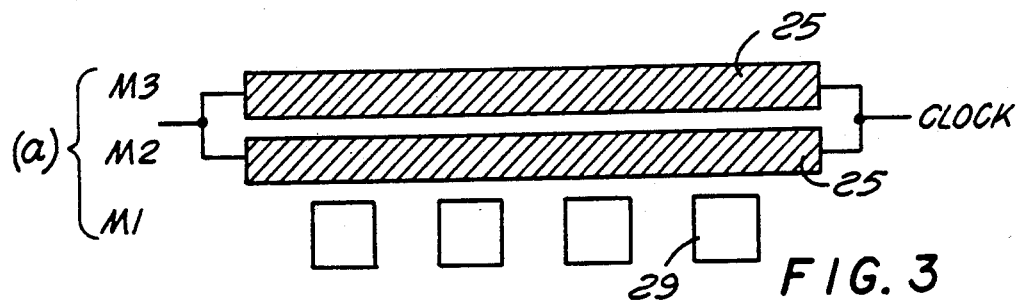
FIG. 3 is a side view of a second variation of the invention.

The arrangement illustrated in FIGS. 2(a) and (b) may be modified in various ways in order meet specific requirements of particular circuits and to produce greater or lesser resistance or capacitance. For example, FIG. 3 illustrates a side view of an arrangement having the same top view as FIG. 2(a) in which the metal clock path 25 is divided between two metal layers in order to reduce the resistance exhibited by the path 25. In such an arrangement, each of the individual halves of the path 25 has a grounded conductor 27 to each side of it to provide shielding from conductors in the same metal layer. In an integrated circuit having three layers of conductors, the number of jumpers 29 available is reduced by this arrangement, and all jumpers are positioned below the path 25. The use of such an arrangement instead of the arrangement of FIG. 2(b) will depend of the requirements of the particular integrated circuit.

Figure 4:
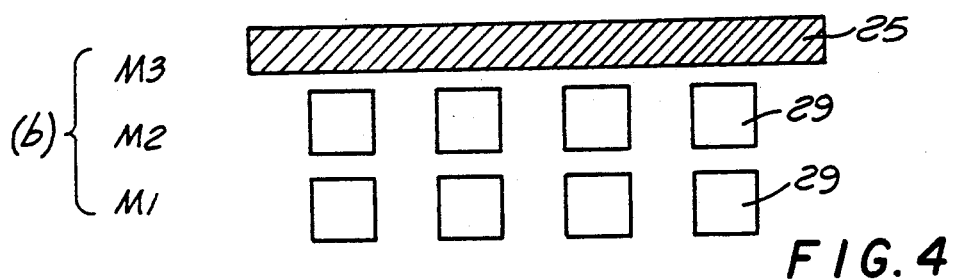
FIG. 4 is a side view of a third variation of the invention.

Another arrangement for jumpers 29 is illustrated in FIG. 4. In this arrangement, a single layer is used for the path 25 and conductors 27 are placed to each side of it in the manner described with respect to FIGS. 2(a) and (b). However, two rows of jumpers 29 are employed. Not only does this allow more jumpers 29 (and thus more conductors) to cross the path 25 within a limited distance, it also allows the layer of jumpers 29 closest to the path 25 to provide shielding for the path 25 and essentially eliminates any capacitive effect with respect to the lower row of jumpers 29. The arrangement provides the lowest capacitive effect for a given length of the path 25 and, again, would be selected determined by the requirements of the integrated circuit.

As discussed above, the present invention allows the optimization of the integrated circuit clock circuitry to be easily automated. For example, in order to obtain the fastest clock times, cells of the various types described may be designed and made selectable by software. In a path 25, it is desirable to provide that the path closest to the driver which carries the largest current have the lowest resistance. Consequently, for this portion of the path 25, a cell using the jumper arrangement of FIG. 3 may be selected to reduce the resistance. Moreover, in this portion 18 the path 25 may be widened to a dimension at which resistance is the lowest possible for the particular integrated circuit. In the portions 19, on the other hand, cells like those described in FIGS. 2(a) and (b) which have intermediate resistance and capacitance may be used and the width of the path 25 narrowed. In the portions 20 and 21, on the other hand, cells like those described in FIG. 4 which have the lowest capacitance may be used and the width of the path 25 narrowed. In this manner of selective design using standardized jumper cells and software controlled layout, clock circuitry with essentially no clock skew and the minimum RC delay may be produced.

Figure 5:
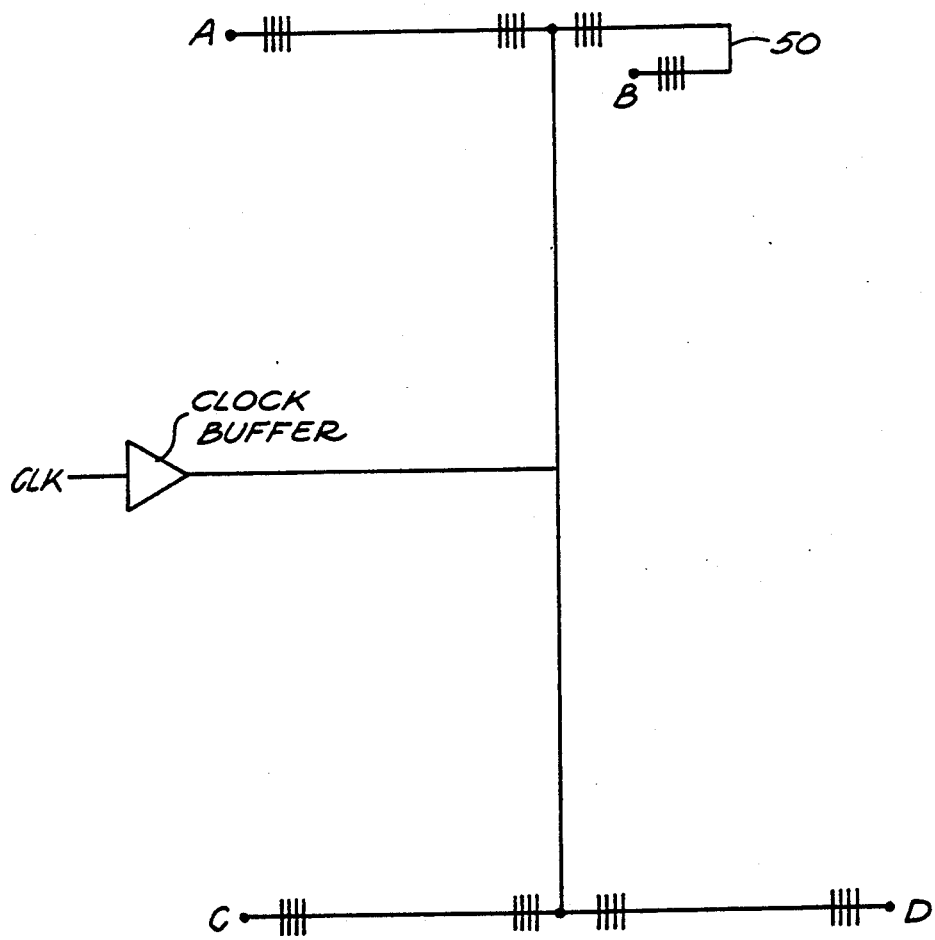
FIG. 5 is another layout of an abbreviated wiring diagram for transferring clock signals on an integrated circuit chip in accordance with the invention.

FIG. 5 illustrates an arrangement in which the elements of the invention are combined as discussed. As may be seen, all of the paths of the clock are the same length and have jumpers positioned in locations which are the same distances in each path from the driver circuit 16 A variation of the path is illustrated at 50 where, although the particular branch is the same length as are other branches and has its jumpers positioned at the same distances as do the other branches, the particular branch is of a different shape. The peculiar shape of the branch containing the path 50 is due to the fact that a block of circuitry is positioned closer to the clock driver circuit than are other blocks; however, it is necessary to keep the length of the branch the same as the length of the other branches in the tree. It should be noted that branches running from a particular node 51 to a node 52, from a node 52 to a node 53, or contorted branches such as the branch 50 may be designed in their entirety as standard cells so that they may be placed automatically in the schematically by computer design tools.

In addition, the arrangement may be used with two, three of four metal layers of conductors. In the present specification, only three layers are illustrated but the modifications to realize two or four layers will be obvious to those skilled in the art in view of the illustrations already given for three metal layers.

Although the present invention has been described in terms of a preferred embodiment, it will be appreciated that various modifications and alterations might be made by those skilled in the art witout departing from the spirit and scope of the invention. The invention should therefore be measured in terms of the claims which follow.

What is claim is:

1. A balanced tree clock distribution network for an integrated circuit comprising a branching clock line of layered metal in which each branch of the clock line has equal resistance, means for shielding the clock line on both sides in a same layer of material of the integrated circuit, and means for providing jumpers for crossing the clock line at right angles in a different layer of material of the integrated circuit, which jumpers appear at the same preselected distance along each branch of the clock line.

2. A balanced tree clock distribution network for an integrated circuit as claimed in claim 1 which the means for shielding the clock line on both sides in a same layer of material comprises a pair of metal conductors, one such conductor positioned on each side of the clock line in a same layer of material of the integrated circuit, each such conductor being placed at a voltage level adapted to decouple the clock line with respect to capacitive effect of surrounding conductors.

3. A balanced tree clock distribution network for an integrated circuit as claimed in claim 2 in which each of the conductors positioned on each side of the clock line in a same layer of meaterial of the integrated circuit is positioned at a distance from the clock line such that an increase in the distance does not substantially increase the capacitance between the clock line and the conductor.

4. A balanced tree clock distribution network for an integrated circuit as claimed in claim 3 in which the means for providing jumpers for crossing the clock line at right angles in a different layer of material of the integrated circuit comprises a standard cell adapted to be placed in the clock line by software controlling the design of the integrated circuit.

5. A balanced tree clock distribution network for an integrated circuit as claimed in claim 4 in which the standard cell comprises a first metal layer containing jumpers, a second metal layer containing the clock line and a pair of conductors running parallel to the clock line for providing capacitive shielding for the clock line, and a third metal layer containing jumpers.

6. A balanced tree clock distribution network for an integrated circuit as claimed in claim 4 in which the standard cell comprises a first metal layer containing jumpers, a second metal layer containing a first portion of the clock line and a pair of conductors running parallel to the clock line for providing capacitive shielding for the first portion of the clock line, and a third metal layer containing a second portion of the clock line and a pair of conductors running parallel to the clock line for providing capacitive shielding for the second portion of the clock line.

7. A balanced tree clock distribution network for an integrated circuit as claimed in claim 4 in which the standard cell comprises a first metal layer containing jumpers, a second metal layer containing jumpers, and a third metal layer containing the clock line and a pair of conductors running parallel to the clock line for providing capacitive shielding for the clock line.

8. A balanced tree clock distribution network for an integrated circuit as claimed in claim 1 in which the means for providing jumpers for crossing the clock line at right angles in a different layer of material of the integrated circuit comprises a standard cell adapted to be placed in the clock line by software controlling the design of the integrated circuit.

9. A balanced tree clock distribution network for an integrated circuit as claimed in claim 8 in which the standard cell comprises a first metal layer containing jumpers, a second mental layer containing the clock line and a pair of conductors running parallel to the clock line for providing capacitive shielding for the clock line, and a third metal layer containing jumpers.

10. A balanced tree clock distribution network for an integrated circuit as claimed in claim 8 in which the standard cell comprises a first metal layer containing jumpers, a second metal layer containing a first portion of the clock line and a pair of conductors running parallel to the clock line for providing capacitive shielding for the first portion of the clock line, and third metal layer containing a second portion of the clock line and a pair of conductors running parallel to the clock line for providing capacitive shielding for the second portion of the clock line.

11. A balanced tree clock distribution network for an integrated circuit as claimed in claim 8 in which the standard cell comprises a first metal layer containing jumpers, a second metal layer containing jumpers, and a third metal layer containing the clock line and a pair of conductors running parallel to the clock line for providing capacitive shielding for the clock line.

12. A method for constructing a balanced tree clock distribution network for an integrated circuit including the steps of designing a set of standard cells for the clock line, each of said cells including a layer of material having a sub-portion of a metal clock line and capacitive shielding for that portion of the clock line, certain of said cells also including at least one other layer of material including jumpers at right angles to the portion of the clock line; and selecting from the standard cells to produce a clock line network having branches with equal resistance and equal capacitance by positioning cells including jumpers at the same positions in each of the branches of the clock line network.

13. A method for constructing a balanced tree clock distribution network for an integrated circuit as claimed in claim 12 futher comprising the step of selecting from the standard cells to produce a clock line network having branches each having lower resistance at an end of the clock line network adjacent a driver circuit and a lower capacitance at an end of the clock line network farthest from the driver circuit.

* * * * *